United States Patent
Adams, Jr. et al.

(10) Patent No.: US 7,769,241 B2
(45) Date of Patent: Aug. 3, 2010

(54) METHOD OF SHARPENING USING PANCHROMATIC PIXELS

(75) Inventors: James E. Adams, Jr., Rochester, NY (US); Michele O'Brien, Rochester, NY (US); John F. Hamilton, Jr., Rochester, NY (US); Bruce H. Pillman, Rochester, NY (US); Amy D. Enge, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 877 days.

(21) Appl. No.: 11/621,139

(22) Filed: Jan. 9, 2007

(65) Prior Publication Data

US 2008/0166062 A1     Jul. 10, 2008

(51) Int. Cl.
G06K 9/40     (2006.01)
H04N 1/46     (2006.01)

(52) U.S. Cl. ...................................... 382/263; 358/532
(58) Field of Classification Search ................. 382/162, 382/167, 191, 254, 255, 276, 284, 312; 358/447, 358/505, 518, 532, 540; 348/147, 222.1, 348/229.1
See application file for complete search history.

(56) References Cited

U.S. PATENT DOCUMENTS

| | | | |
|---|---|---|---|
| 5,038,388 A | 8/1991 | Song | |
| 5,237,402 A | 8/1993 | Deshon et al. | |
| 5,708,729 A | 1/1998 | Adams et al. | |
| 5,949,914 A * | 9/1999 | Yuen | 382/254 |
| 6,011,875 A * | 1/2000 | Laben et al. | 382/276 |
| 6,097,835 A * | 8/2000 | Lindgren | 382/162 |
| 6,173,085 B1 | 1/2001 | Hamilton, Jr. et al. | |
| 6,529,239 B1 | 3/2003 | Dyck et al. | |
| 6,757,012 B1 | 6/2004 | Hubina et al. | |
| 6,813,046 B1 * | 11/2004 | Gindele et al. | 358/505 |
| 6,937,774 B1 * | 8/2005 | Specht et al. | 382/254 |
| 7,298,922 B1 * | 11/2007 | Lindgren et al. | 382/294 |
| 7,340,099 B2 * | 3/2008 | Zhang | 382/191 |
| 7,379,590 B2 * | 5/2008 | Zhang | 382/167 |
| 2003/0222998 A1 | 12/2003 | Yamauchi et al. | |
| 2005/0047674 A1 | 3/2005 | Walmsley et al. | |
| 2008/0030611 A1 * | 2/2008 | Jenkins | 348/336 |

FOREIGN PATENT DOCUMENTS

EP     1 594 321     11/2005

* cited by examiner

Primary Examiner—Kanji Patel
(74) Attorney, Agent, or Firm—Raymond L. Owens (57) ABSTRACT

A method of sharpening a full-color image of a scene includes capturing an image of the scene using a two-dimensional sensor array having both color and panchromatic pixels; forming the full-color image in response to the captured color pixels and forming a reference panchromatic image in response to the captured panchromatic pixels; forming a high-frequency panchromatic image from the reference panchromatic image; and providing a sharpened full-color image in response to the high-frequency panchromatic image and the full-color image.

11 Claims, 13 Drawing Sheets

METHOD OF SHARPENING USING PANCHROMATIC PIXELS

CROSS REFERENCE TO RELATED APPLICATIONS

Reference is made to commonly assigned U.S. patent application Ser. No. 11/341,206, filed Jan. 27, 2006 by James E. Adams, Jr. et al, entitled "Interpolation of Panchromatic and Color Pixels", and U.S. patent application Ser. No. 11/565,451, filed Nov. 29, 2006 by James E. Adams, Jr. et al, entitled "Providing a Desired Resolution Color Image", the disclosures of which are incorporated herein.

FIELD OF THE INVENTION

The present invention relates to forming a color image having a desired sharpness from a panchromatic image and a color image having less than the desired sharpness.

BACKGROUND OF THE INVENTION

Video cameras and digital still cameras generally employ a single image sensor with a color filter array to record a scene. This approach begins with a sparsely populated single-channel image in which the color information is encoded by the color filter array pattern. Subsequent interpolation of the neighboring pixel values permits the reconstruction of a complete three-channel, full-color image. This full-color image, in turn, can be sharpened to improve the appearance of sharp edges and fine detail. One popular approach is to either directly detect or synthesize a luminance color channel, e.g. "green", and then to generate a high-frequency luminance image as an initial step. This high-frequency luminance channel is then modified in a variety of ways and then added to the full-color image to produce a sharpened full-color image. One typical example is taught in U.S. Pat. No. 5,237,402 (Deshon et al.) in which the full-color image is converted into a luminance-chrominance space and a high-frequency luminance image is generated from the luminance channel and then added back to the full-color image after color correction and conversion back to the original color space. A method of high-frequency luminance image modification based on adaptive amplification of the high-frequency luminance values is disclosed in U.S. Pat. No. 5,038,388 (Song).

In the instance of remote sensing (satellite imagery), it is advantageous from a signal-to-noise perspective to directly sense a panchromatic channel using scanning optical system. This panchromatic channel can then be used in place of a luminance channel in the sharpening process. U.S. Pat. No. 5,949,914 (Yuen) describes directly sensing a higher-resolution panchromatic image and several lower-resolution narrow-band color images, and performing an iterative deconvolution process responsive to the panchromatic image to sharpen the narrow-band color images. U.S. Pat. No. 6,097,835 (Lindgren) teaches a method of projecting the directly sensed, higher resolution panchromatic image onto the lower narrow-band color images to extract the appropriate sharpening image components that are subsequently used to sharpen the narrow-band color images. The direct implementation of these methods in video and digital still cameras is hampered by the inability to incorporate similar scanning optical system within said cameras.

Under low-light imaging situations, it is advantageous to have one or more of the pixels in the color filter array unfiltered, i.e. white or panchromatic in spectral sensitivity. These panchromatic pixels have the highest light sensitivity capability of the capture system. Employing panchromatic pixels represents a tradeoff in the capture system between light sensitivity and color spatial resolution. To this end, many four-color color filter array systems have been described. U.S. Pat. No. 6,529,239 (Dyck et al.) teaches a green-cyan-yellow-white pattern that is arranged as a 2×2 block that is tessellated over the surface of the sensor. U.S. Pat. No. 6,757,012 (Hubina et al.) discloses both a red-green-blue-white pattern and a yellow-cyan-magenta-white pattern. In both cases, the colors are arranged in a 2×2 block that is tessellated over the surface of the imager. The difficulty with such systems is that only one-quarter of the pixels in the color filter array have highest light sensitivity, thus limiting the overall low-light performance of the capture device.

To address the need of having more pixels with highest light sensitivity in the color filter array, U.S. patent application Publication No. 2003/0210332 (Frame) describes a pixel array with most of the pixels being unfiltered. Relatively few pixels are devoted to capturing color information from the scene producing a system with low color spatial resolution capability. Additionally, Frame teaches using simple linear interpolation techniques that are not responsive to or protective of high frequency color spatial details in the image.

SUMMARY OF THE INVENTION

It is an object of the present invention to produce a digital color image having the desired sharpness from a digital image having panchromatic and color pixels.

This object is achieved by a method of sharpening a full-color image of a scene comprising:

(a) capturing an image of the scene using a two-dimensional sensor array having both color and panchromatic pixels;

(b) forming the full-color image in response to the captured color pixels and forming a reference panchromatic image in response to the captured panchromatic pixels;

(c) forming a high-frequency panchromatic image from the reference panchromatic image; and (d) providing a sharpened full-color image in response to the high-frequency panchromatic image and the full-color image.

It is a feature of the present invention that images can be captured under low-light conditions with a sensor having panchromatic and color pixels and processing produces the desired sharpness in a digital color image produced from the panchromatic and colored pixels.

The present invention makes use of a color filter array with an appropriate composition of panchromatic and color pixels in order to permit the above method to provide both improved low-light sensitivity and improved color spatial resolution fidelity. The above method preserves and enhances panchromatic and color spatial details and produce a sharpened full-color image.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
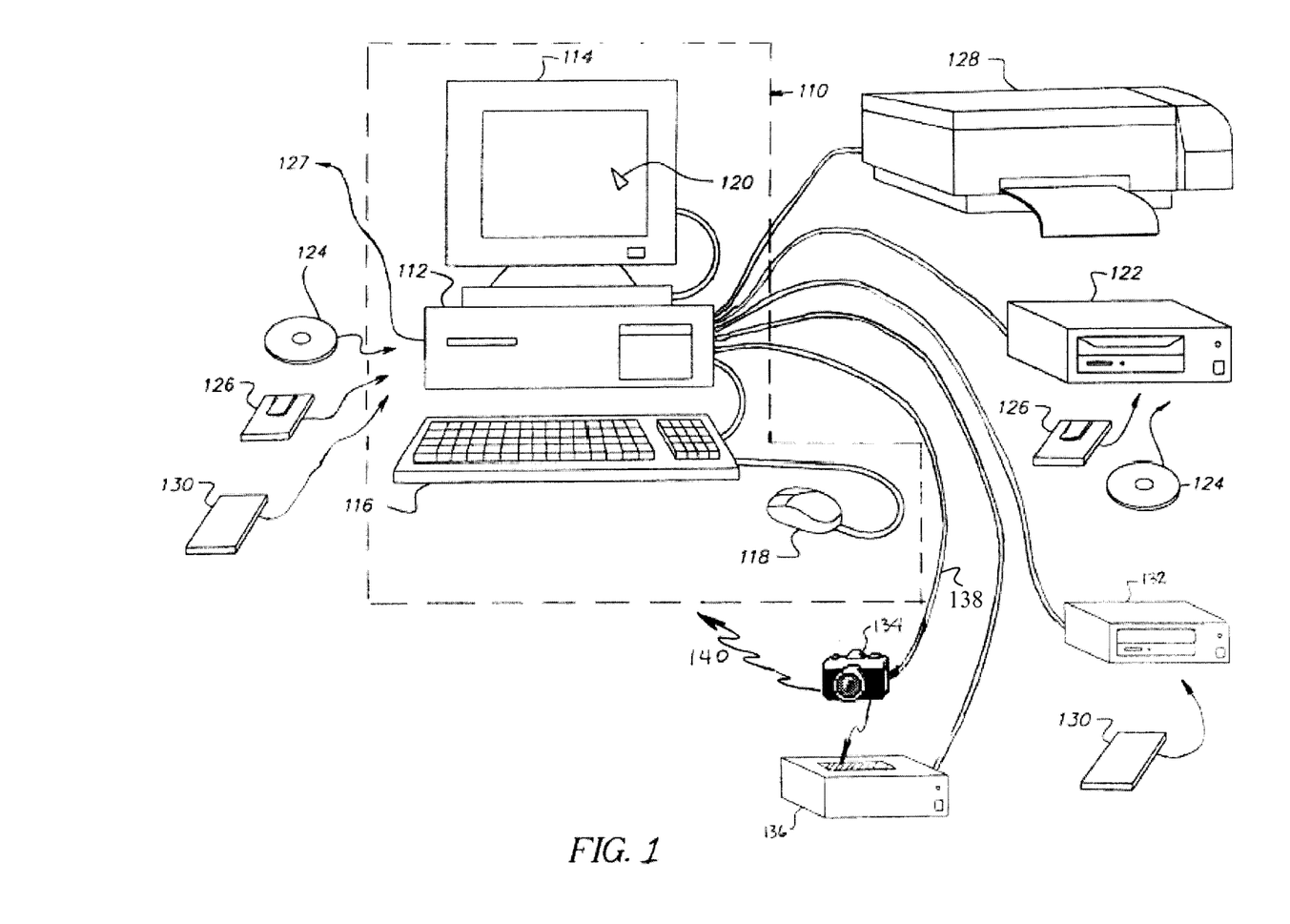
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the PC card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the compact disk-read only memory (CD-ROM) 124, the floppy disk 126, or the network connection 127. Any images stored in the PC card 130, the floppy disk 126 or the compact disk-read only memory (CD-ROM) 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to sharpen the images.

Figure 2:
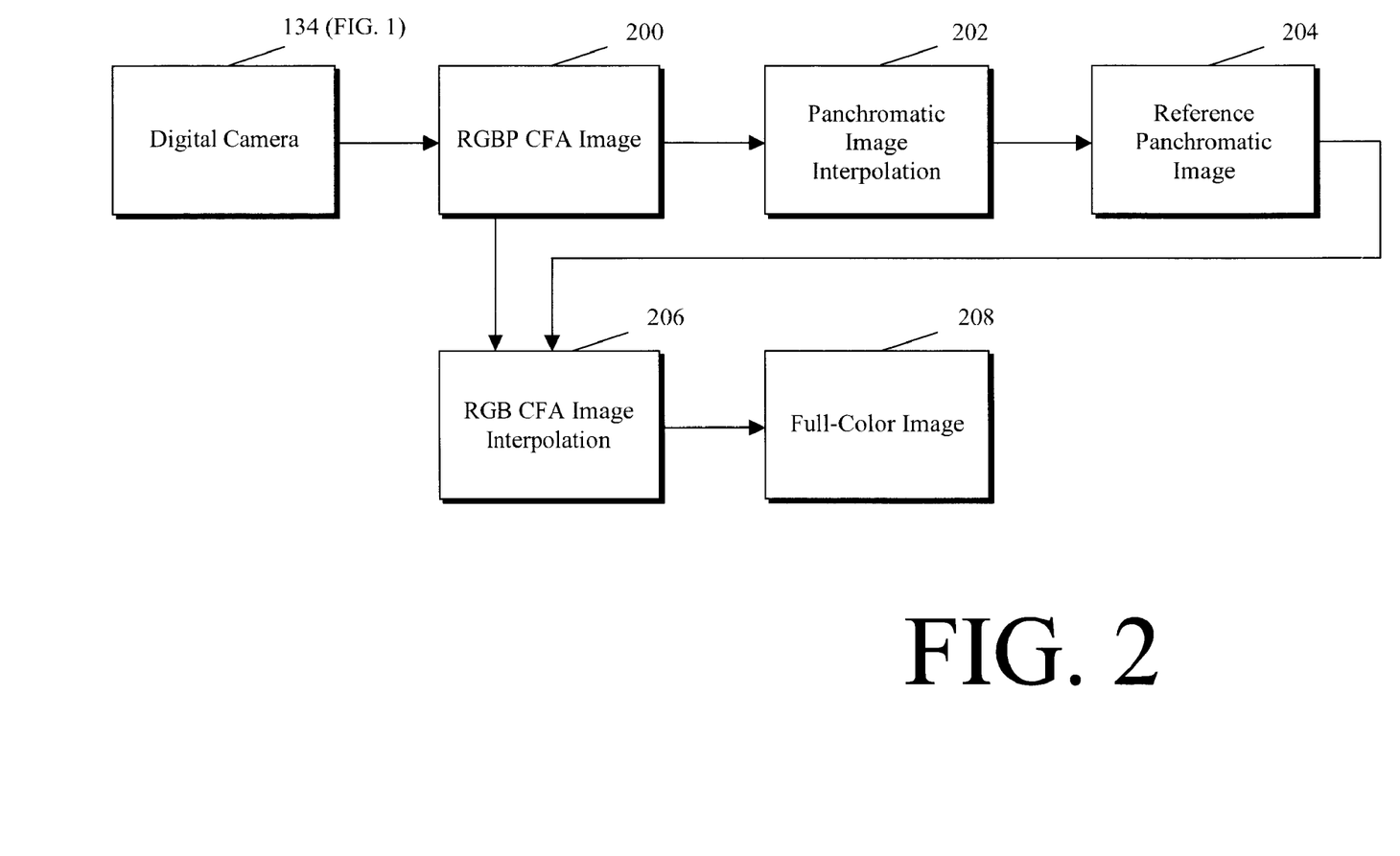
FIG. 2 is a block diagram of a portion of a preferred embodiment of the present invention.

FIG. 2 is a high-level diagram the first portion of a preferred embodiment of the present invention. The digital camera 134 is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic image interpolation block 202 produces a reference panchromatic image 204 from the RGBP CFA image 200. At this point in the image processing chain, each color pixel location has an associated panchromatic value and either a red, green, or a blue value. From the RGBP CFA image 200 and the reference panchromatic image 204, an RGB CFA image interpolation block 206 subsequently produces a full-color image 208. In FIG. 2, the panchromatic image interpolation block 202 and the RGB CFA image interpolation block 206 can be performed in any appropriate ways known to those skilled in the art.

Figure 3:
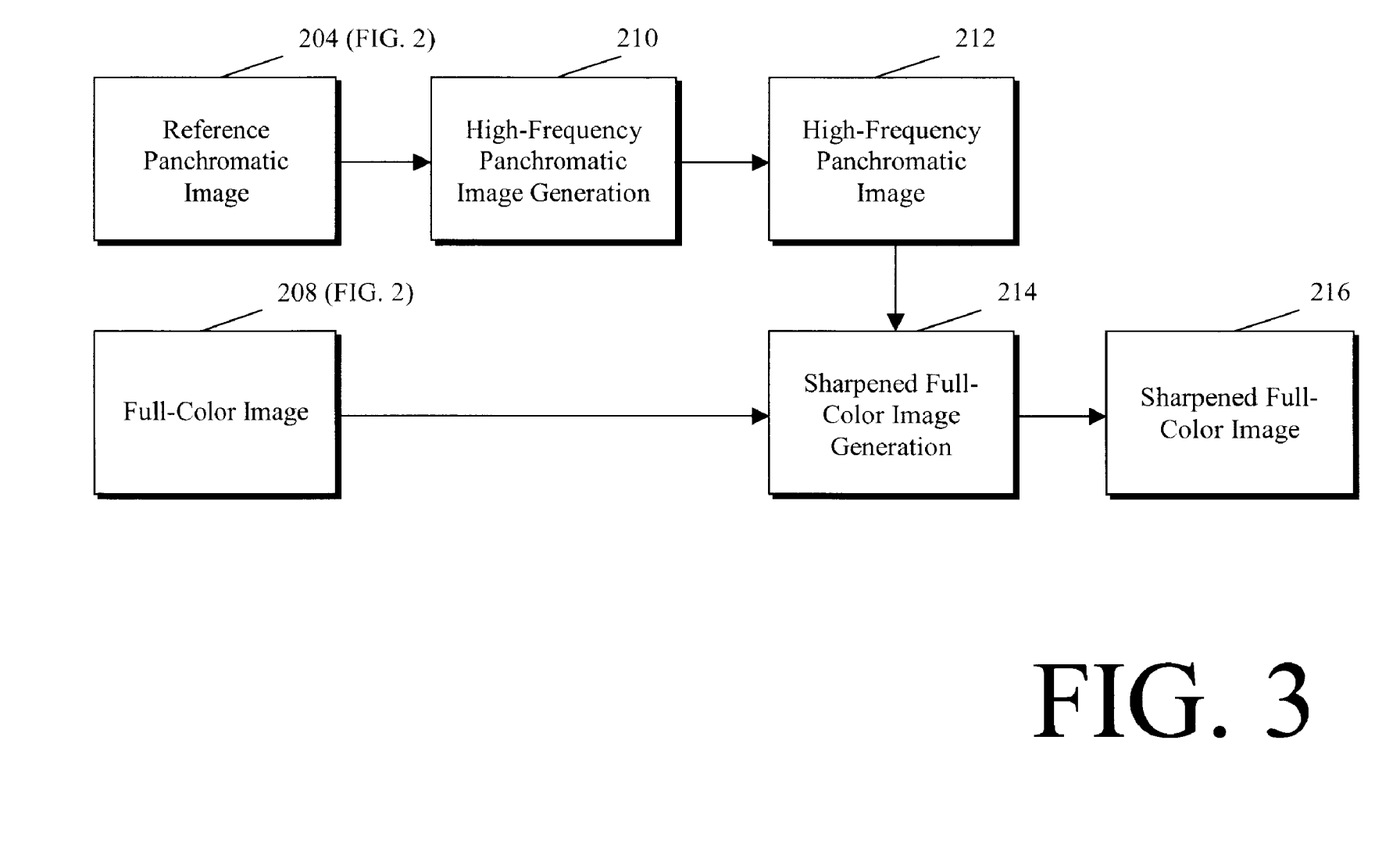
FIG. 3 is a block diagram showing another portion of the preferred embodiment of the present invention.

FIG. 3 is a high-level diagram of the second portion of the preferred embodiment of the present invention. A high-frequency panchromatic image generation block 210 produces a high-frequency panchromatic image 212 from the reference panchromatic image 204 (FIG. 2). The sharpened full-color image generation block 214 produces a sharpened full-color image 216 from the high-frequency panchromatic image 212 and the full-color image 208 (FIG. 2).

In FIG. 3, the high-frequency panchromatic image generation block 210 can be performed in any appropriate way known to those skilled in the art. Two examples are given. The first example is to perform a convolution of the reference panchromatic image 204 (FIG. 2) with the following high-pass convolution kernel to produce the high-frequency panchromatic image 212:

$$\frac{1}{16}\begin{pmatrix} -1 & -2 & -1 \\ -2 & 12 & -2 \\ -1 & -2 & -1 \end{pmatrix}$$

The second example is to perform a convolution of the reference panchromatic image 204 (FIG. 2) with the following low-pass convolution kernel to produce a low-frequency panchromatic image:

$$\frac{1}{16}\begin{pmatrix} 1 & 2 & 1 \\ 2 & 4 & 2 \\ 1 & 2 & 1 \end{pmatrix}$$

The low-frequency panchromatic image is now subtracted from the reference panchromatic image 204 (FIG. 2) to produce the high-frequency panchromatic image 212.

In FIG. 3, the sharpened full-color image generation block 214 can be performed in any appropriate way known to those skilled in the art. As an example, the high-frequency panchromatic image 212 is added to the full-color image 208 (FIG. 2) to produce a sharpened full-color image 216.

Figure 4:
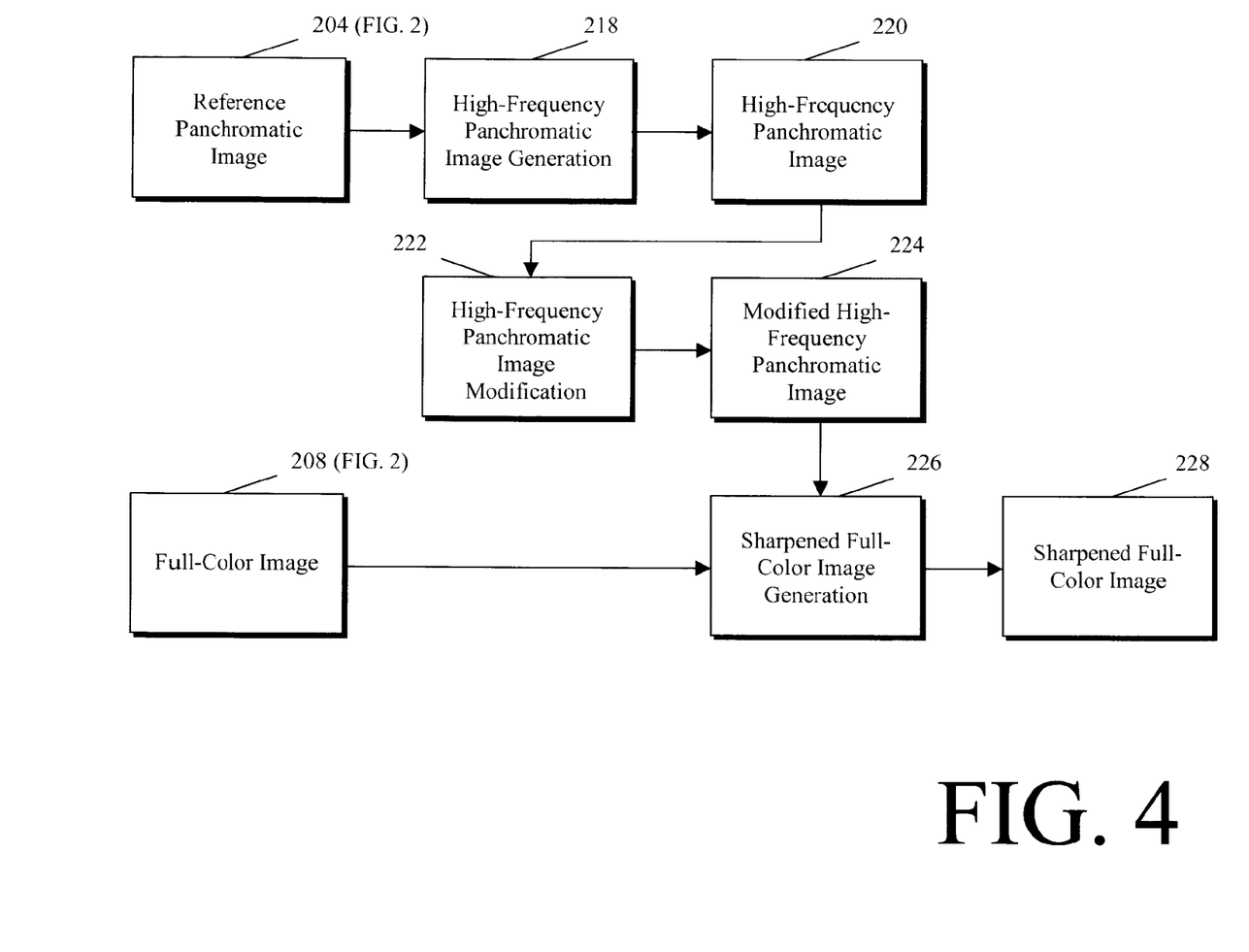
FIG. 4 is a block diagram showing an alternate embodiment of the present invention.

FIG. 4 is a high-level diagram of an alternate embodiment of the present invention. A high-frequency panchromatic image generation block 218 produces a high-frequency panchromatic image 220 from the reference panchromatic image 204 (FIG. 2). A high-frequency panchromatic image modification block 222 produces a modified high-frequency panchromatic image 224 from a high-frequency panchromatic image 220. A sharpened full-color image generation block 226 produces a sharpened full-color image 228 from the modified high-frequency panchromatic image 224 and the full-color image 208 (FIG. 2).

In FIG. 4, the high-frequency panchromatic image generation block 218 can be performed in the same way as the high-frequency panchromatic image generation block 210 (FIG. 3). The high-frequency panchromatic image modification block 222 can be performed in any appropriate way known to those skilled in the art. As an example, U.S. Pat. No. 6,173,085 (Hamilton, Jr. et al.) teaches the use of a coring function to modify a high-frequency image. The sharpened full-color image generation block 226 can be performed in the same way as the sharpened full-color image generation block 214 (FIG. 3).

Figure 5:
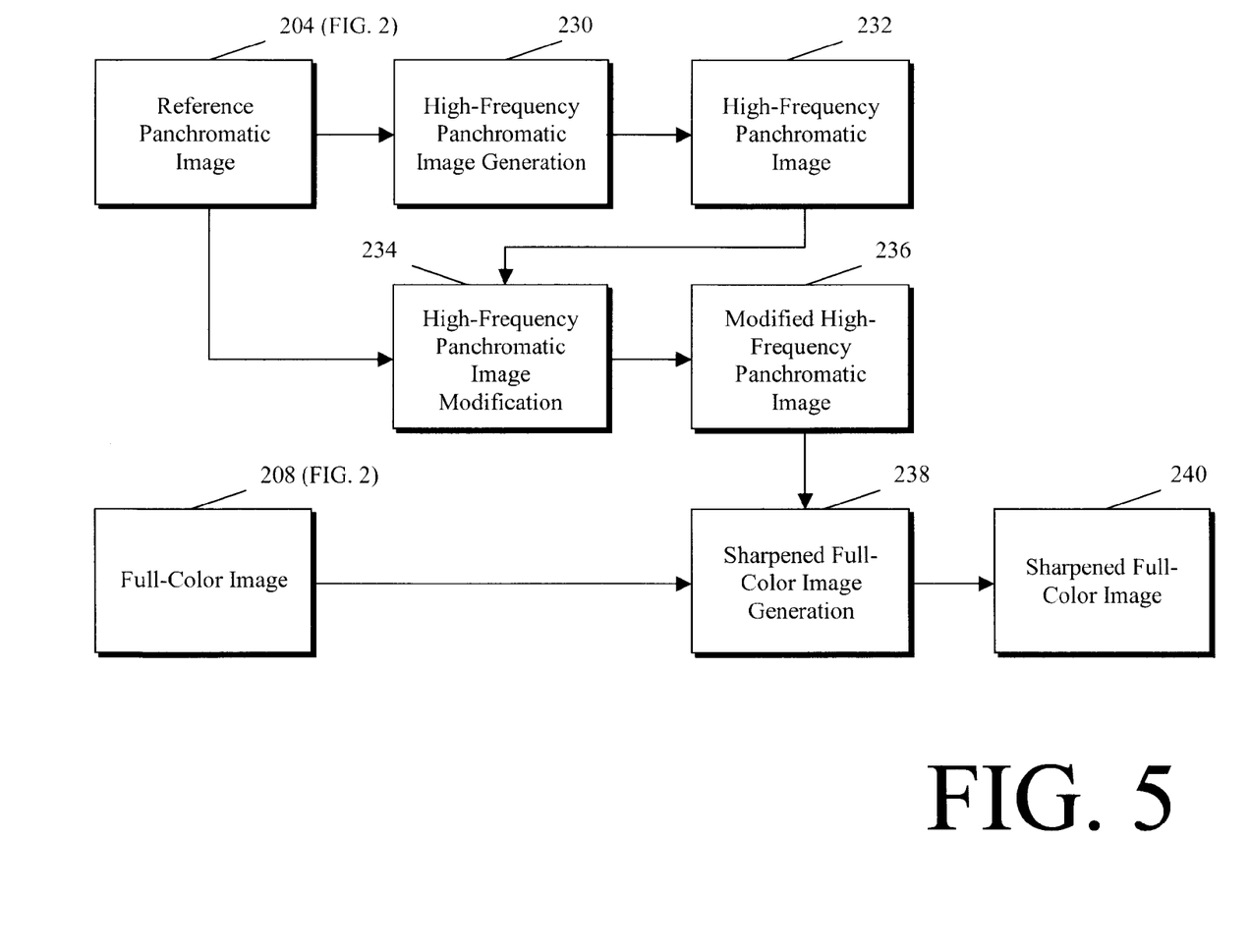
FIG. 5 is a block diagram showing an alternate embodiment of the present invention.

FIG. 5 is a high-level diagram of an alternate embodiment of the present invention. A high-frequency panchromatic image generation block 230 produces a high-frequency panchromatic image 232 from the reference panchromatic image 204 (FIG. 2). A high-frequency panchromatic image modification block 234 produces a modified high-frequency panchromatic image 236 from the high-frequency panchromatic image 232 and the reference panchromatic image 204 (FIG. 2). A sharpened full-color image generation block 238 produces a sharpened full-color image 240 from the modified high-frequency panchromatic image 236 and the full-color image 208 (FIG. 2).

In FIG. 5, the high-frequency panchromatic image generation block 230 can be performed in the same way as the high-frequency panchromatic image generation block 210 (FIG. 3). The high-frequency panchromatic image modification block 234 can be performed in any appropriate way known to those skilled in the art. Examples will be given in subsequent paragraphs. The sharpened full-color image generation block 238 can be performed in the same way as the sharpened full-color image generation block 214 (FIG. 3).

Figure 6:
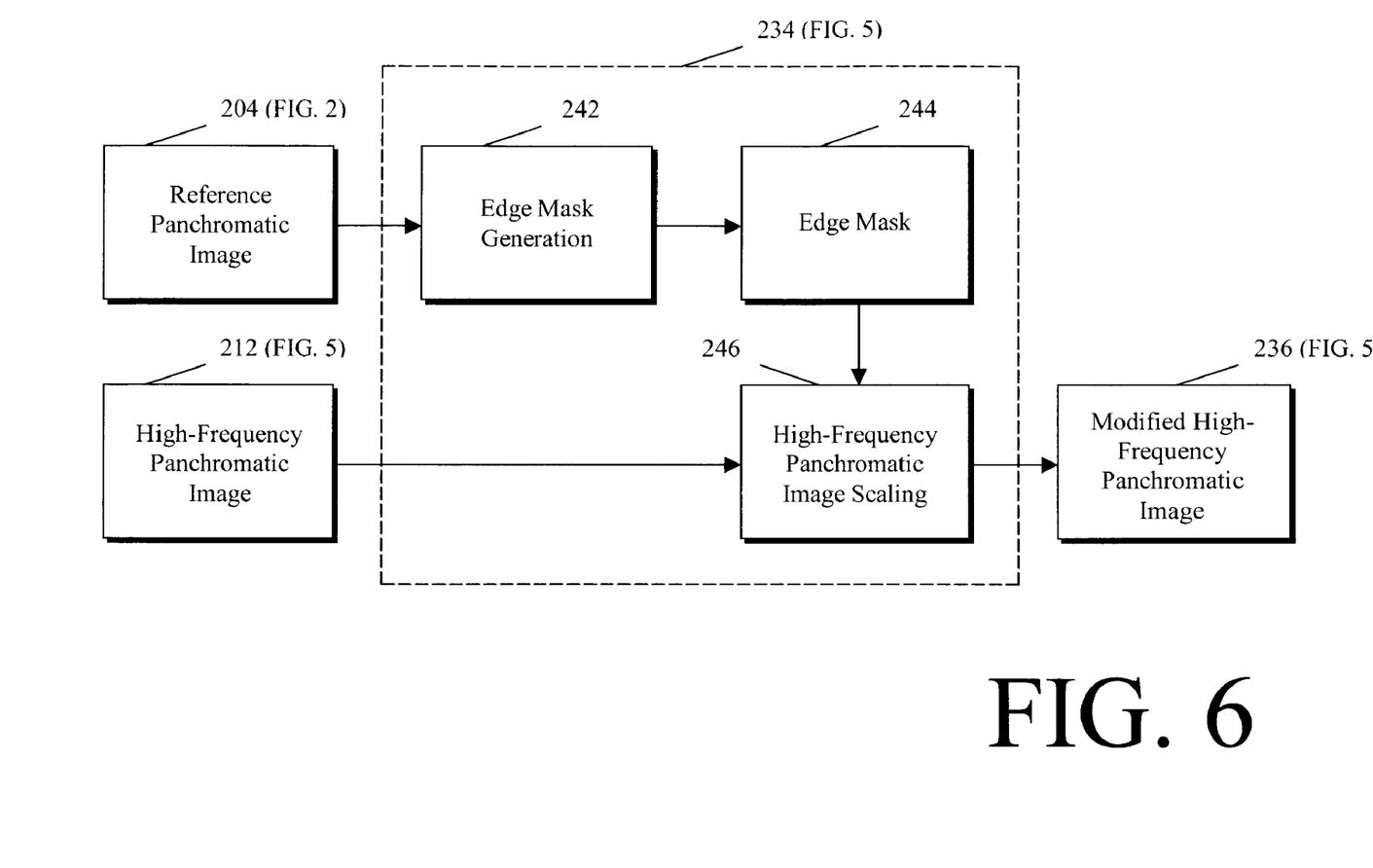
FIG. 6 is a block diagram showing block 234 in FIG. 5 in more detail of an alternate embodiment of the present invention.

FIG. 6 is a detailed diagram of the high-frequency panchromatic image modification block 234 (FIG. 5). An edge mask generation block 242 produces an edge mask 244 from the reference panchromatic image 204 (FIG. 2). A high-frequency panchromatic image scaling block 246 produces the modified high-frequency panchromatic image 236 (FIG. 5) from the edge mask 244 and the high-frequency panchromatic image 212 (FIG. 5).

In FIG. 6, the edge mask generation block 242 can be performed in any appropriate way known to those skilled in the art. As an example, the reference panchromatic image 204 (FIG. 2) can be convolved with one or more edge detection convolution kernels and the results combined as a vector norm. Finally, a small bias value can be subtracted from the resulting vector norm to provide a noise-cleaning capability. As an explicit example:

$$M = k\left(\left|P*\begin{pmatrix} 1 & 0 & -1 \\ 2 & 0 & -2 \\ 1 & 0 & -1 \end{pmatrix}\right| + \left|P*\begin{pmatrix} 1 & 2 & 1 \\ 0 & 0 & 0 \\ -1 & -2 & -1 \end{pmatrix}\right|\right) - b$$

In this equation, M is the edge mask 244, P is the reference panchromatic image 204 (FIG. 2), k is a scaling constant, and b is a predetermined bias constant. k is typically set to a value of one-eighth and can be adjusted from that point to increase or decrease the effects of the edge mask. To determine an appropriate value for b, one typically computes the edge mask with b set to zero and then computes the standard deviation of the edge mask values in a region of P known to be free of scene detail, e.g., a clear sky or a flat wall. b is then set to one or two times the standard deviation. The high-frequency panchromatic image scaling block 246 can be performed in any appropriate way known to those skilled in the art. As an example, the edge mask 244 can be multiplied with the high-frequency panchromatic image 212 (FIG. 5) to produce the modified high-frequency panchromatic image 236 (FIG. 5).

Figure 7:
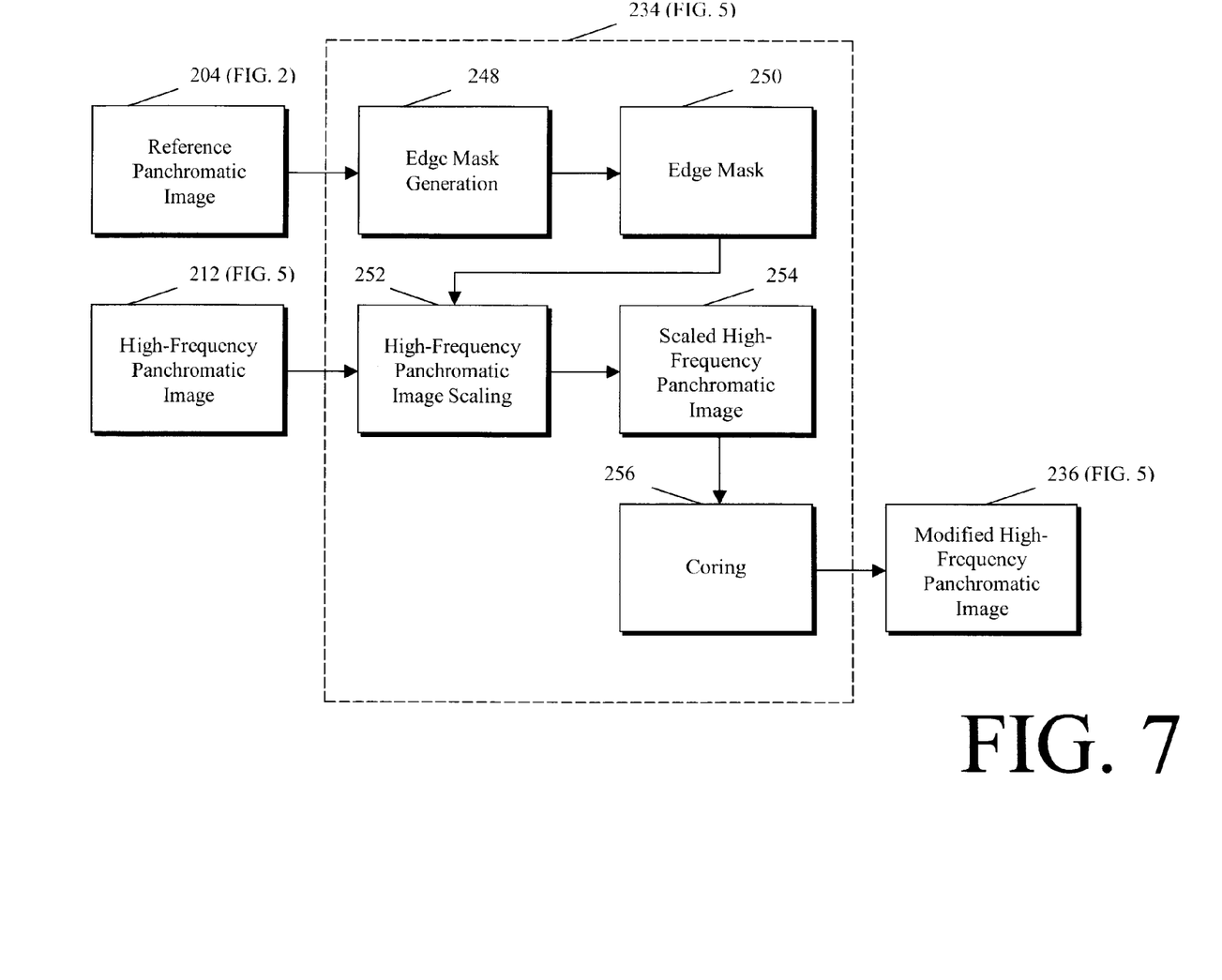
FIG. 7 is a block diagram showing block 234 in FIG. 5 in more detail of an alternate embodiment of the present invention.

FIG. 7 is a detailed diagram of an alternate embodiment of the high-frequency panchromatic image modification block 234 (FIG. 5). An edge mask generation block 248 produces an edge mask 250 from the reference panchromatic image 204 (FIG. 2). A high-frequency panchromatic image scaling block 252 produces a scaled high-frequency panchromatic image 254 from the edge mask 250 and the high-frequency panchromatic image 212 (FIG. 5). A coring block 256 produces the modified high-frequency panchromatic image 236 (FIG. 5) from the scaled high-frequency panchromatic image 254.

In FIG. 7, the edge mask generation block 248 can be performed in the same way as the edge mask generation block 242 (FIG. 6). The high-frequency panchromatic image scaling block 252 can be performed in the same way as the high-frequency panchromatic image scaling block 246 (FIG. 6). The coring block 256 can be performed as in the aforementioned reference U.S. Pat. No. 6,173,085 (Hamilton, Jr. et al.)

Figure 8:
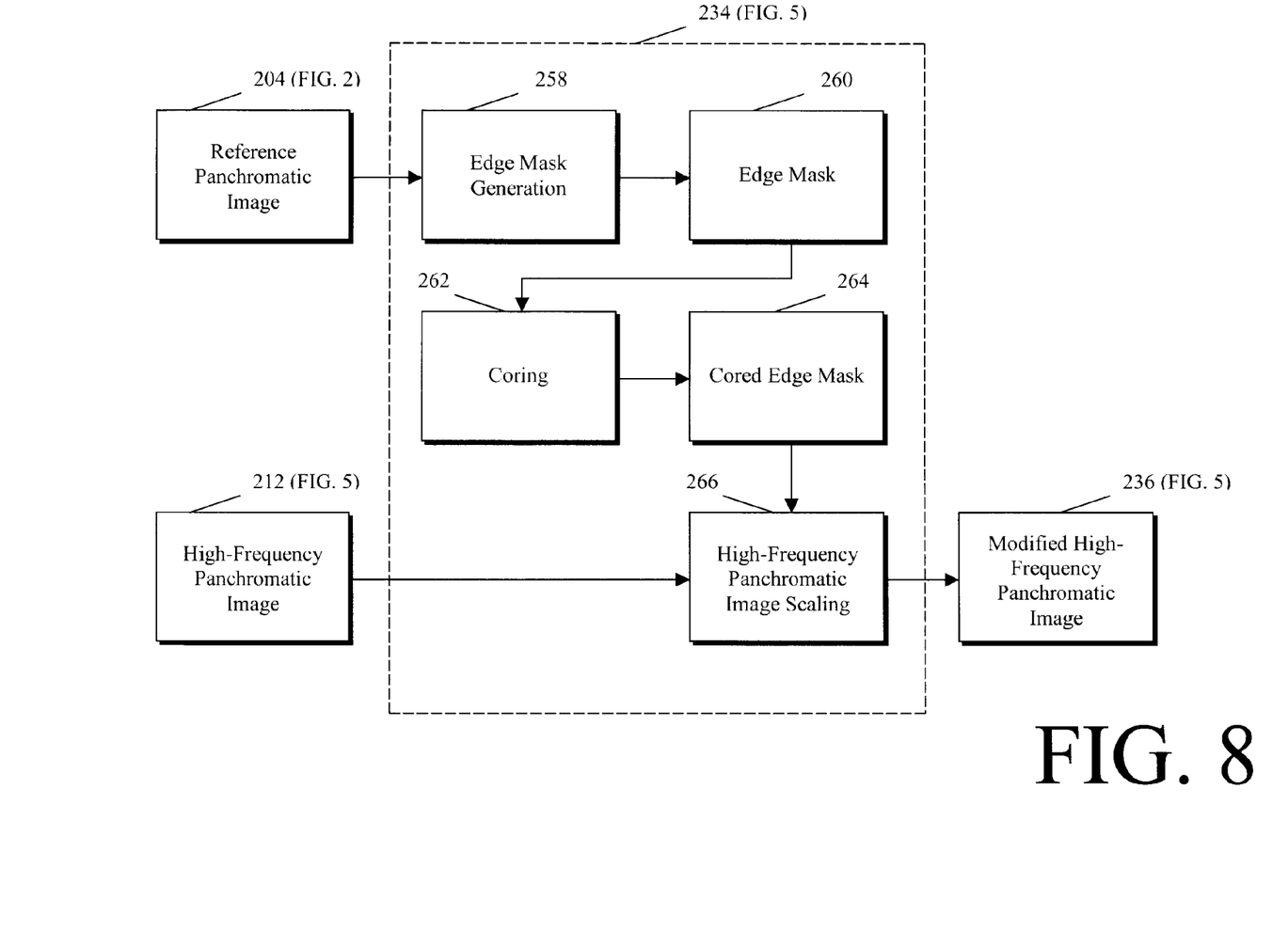
FIG. 8 is a block diagram showing block 234 in FIG. 5 in more detail of an alternate embodiment of the present invention.

FIG. 8 is a detailed diagram of an alternate embodiment of the high-frequency panchromatic image modification block 234 (FIG. 5). An edge mask generation block 258 produces an edge mask 260 from the reference panchromatic image 204 (FIG. 2). A coring block 262 produces a cored edge mask 264 from the edge mask 260. A high-frequency panchromatic image scaling block 266 produces the modified high-frequency panchromatic image 236 (FIG. 5) from the cored edge mask 264 and the high-frequency panchromatic image 212 (FIG. 5).

In FIG. 8, the edge mask generation block 258 can be performed in the same way as the edge mask generation block 242 (FIG. 6). The coring block 262 can be performed in the same way as the coring block 256 (FIG. 7). The high-frequency panchromatic image scaling block 266 can be performed in the same way as the high-frequency panchromatic image scaling block 246 (FIG. 6).

Figure 9:
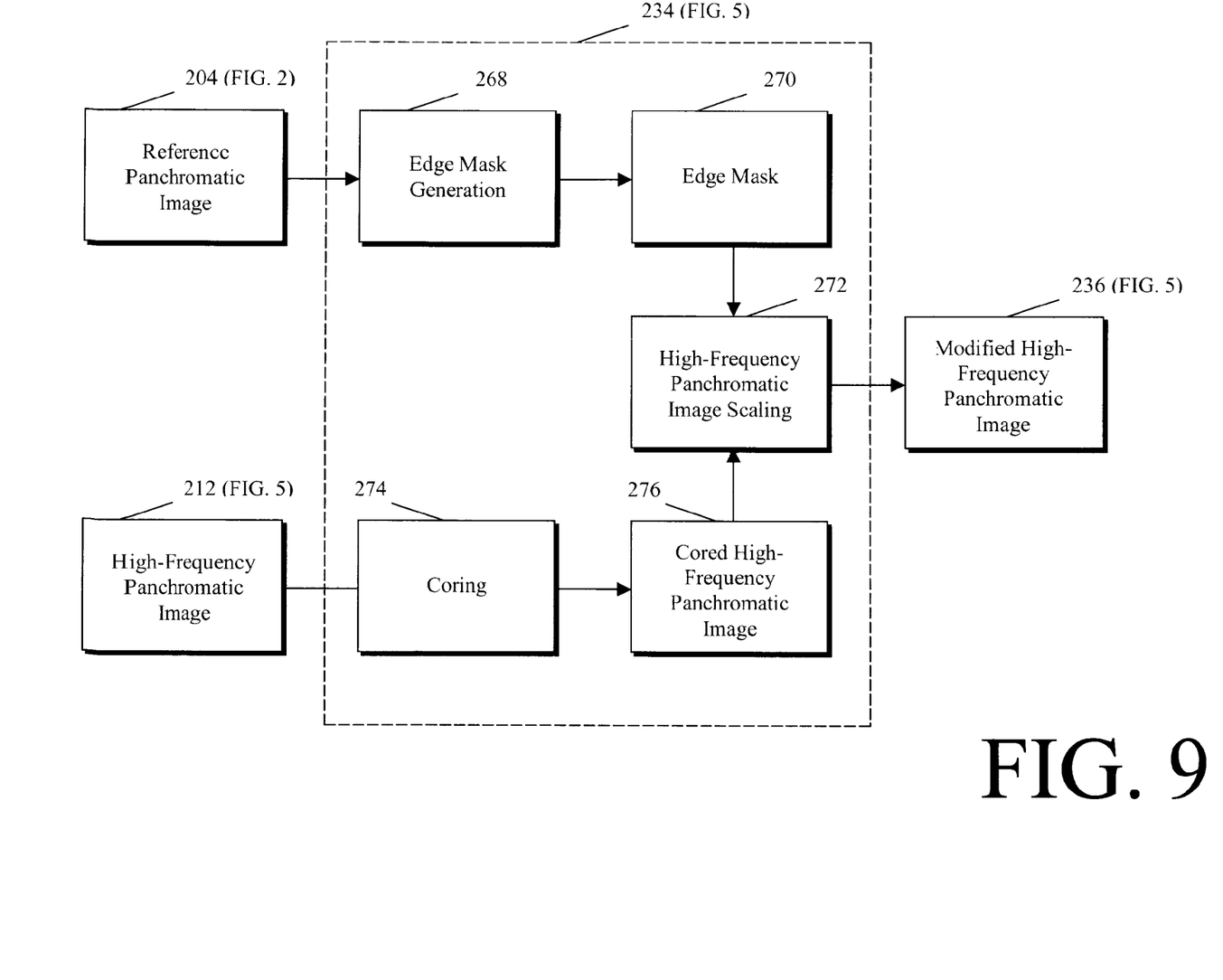
FIG. 9 is a block diagram showing block 234 in FIG. 5 in more detail of an alternate embodiment of the present invention.

FIG. 9 is a detailed diagram of an alternate embodiment of the high-frequency panchromatic image modification block 234 (FIG. 5). An edge mask generation block 268 produces an edge mask 270 from the reference panchromatic image 204 (FIG. 2). A coring block 274 produces a cored high-frequency panchromatic image 276 from the high-frequency panchromatic image 212 (FIG. 5). A high-frequency panchromatic image scaling block 272 produces the modified high-frequency panchromatic image 236 (FIG. 5) from the edge mask 270 and the cored high-frequency panchromatic image 276.

In FIG. 9, the edge mask generation block 268 can be performed in the same way as the edge mask generation block 242 (FIG. 6). The coring block 274 can be performed in the same way as the coring block 256 (FIG. 7). The high-frequency panchromatic image scaling block 272 can be performed in the same way as the high-frequency panchromatic image scaling block 246 (FIG. 6).

Figure 10A:
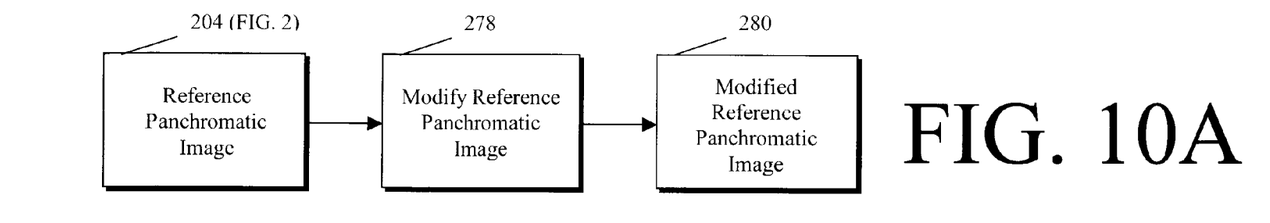
FIG. 10A is a block diagram showing an alternate embodiment of the present invention.

FIG. 10A is a high-level diagram of an alternate embodiment of the present invention. A modify reference panchromatic image block 278 produces a modified reference panchromatic image 280 from the reference panchromatic image 204 (FIG. 2). It will be clear to those skilled in the art that the modified reference panchromatic image 280 can be used in place of the reference panchromatic image 204 (FIG. 2) in any of the previously or subsequently described embodiments of the present invention.

Figure 10B:
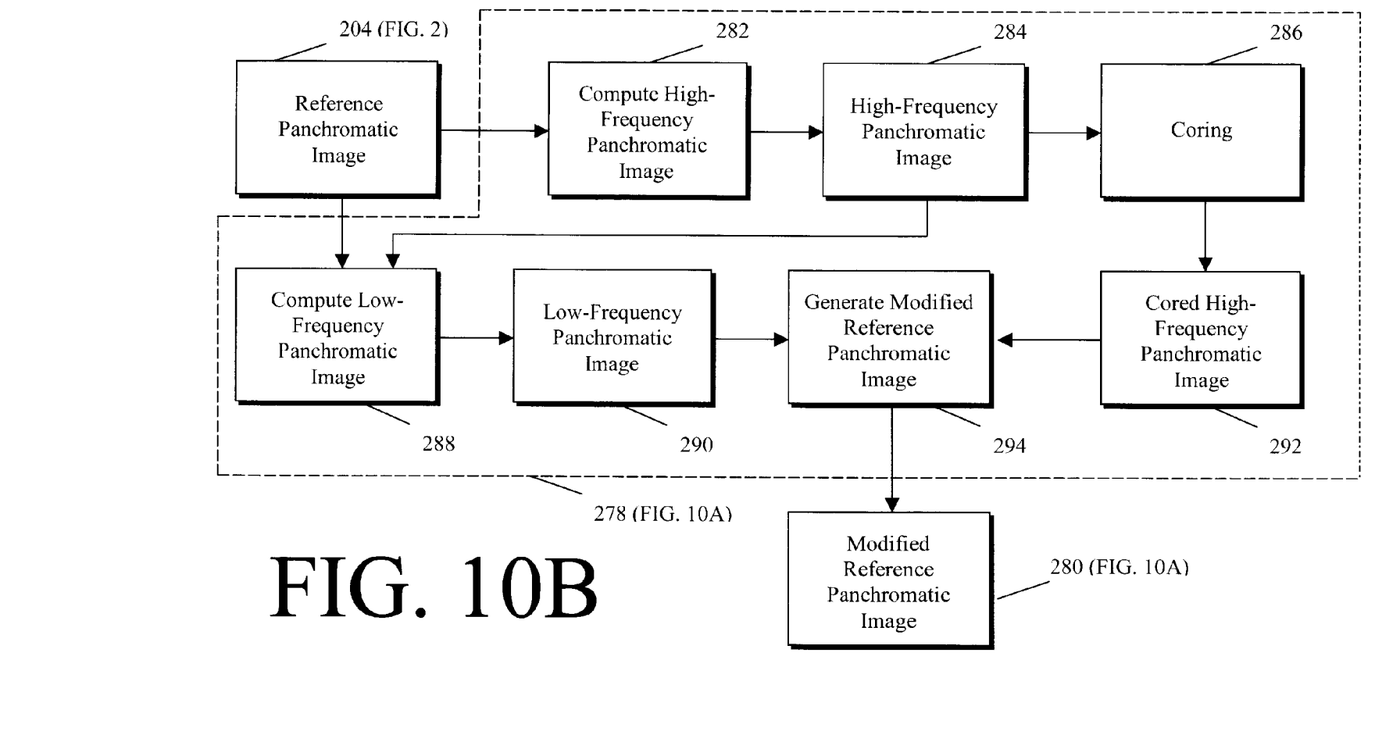
FIG. 10B is a block diagram showing block 278 in FIG. 10A in more detail of an alternate embodiment of the present invention.

FIG. 10B is a detailed diagram of the modify reference panchromatic image block 278 (FIG. 10A). A compute high-frequency panchromatic image block 282 produces a high-frequency panchromatic image 284 from the reference panchromatic image 204 (FIG. 2). A coring block 286 produces a cored high-frequency panchromatic image 292 from the high-frequency panchromatic image 284. A compute low-frequency panchromatic image block 288 produces a low-frequency panchromatic image 290 from the reference panchromatic image 204 (FIG. 2). The generate modified reference panchromatic image block 294 produces the modified reference panchromatic image 280 (FIG. 10A) from the cored high-frequency panchromatic image 292 and the low-frequency panchromatic image 290.

In FIG. 10B, the compute high-frequency panchromatic image block 282 can be performed in the same way as the high-frequency panchromatic image generation block 210 (FIG. 3). The coring block 286 can be performed in the same way as the coring block 256 (FIG. 7). The compute low-frequency panchromatic image block 288 can be performed in any appropriate way known to those skilled in the art. As an example, the high-frequency panchromatic image 284 can be subtracted from the reference panchromatic image 204 (FIG. 2) to produce the low-frequency panchromatic image 290. A generate modified reference panchromatic image block 294 can be performed in any appropriate way known to those skilled in the art. As an example, the cored high-frequency panchromatic image 292 can be added to the low-frequency panchromatic image 290 to produce the modified reference panchromatic image 280 (FIG. 10A).

Figure 11A:
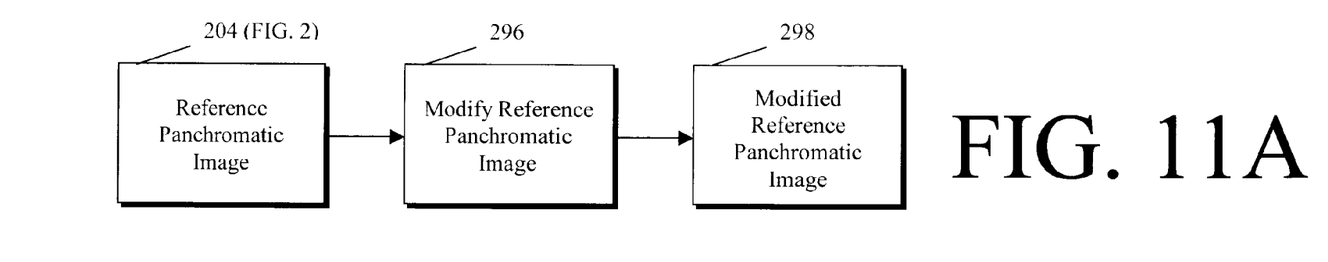
FIG. 11A is a block diagram showing an alternate embodiment of the present invention.

FIG. 11A is a high-level diagram of an alternate embodiment of the present invention. A modify reference panchromatic image block 296 produces a modified reference panchromatic image 298 from the reference panchromatic image 204 (FIG. 2). It will be clear to those skilled in the art that the modified reference panchromatic image 298 can be used in place of the reference panchromatic image 204 (FIG. 2) in any of the previously or subsequently described embodiments of the present invention.

Figure 11B:
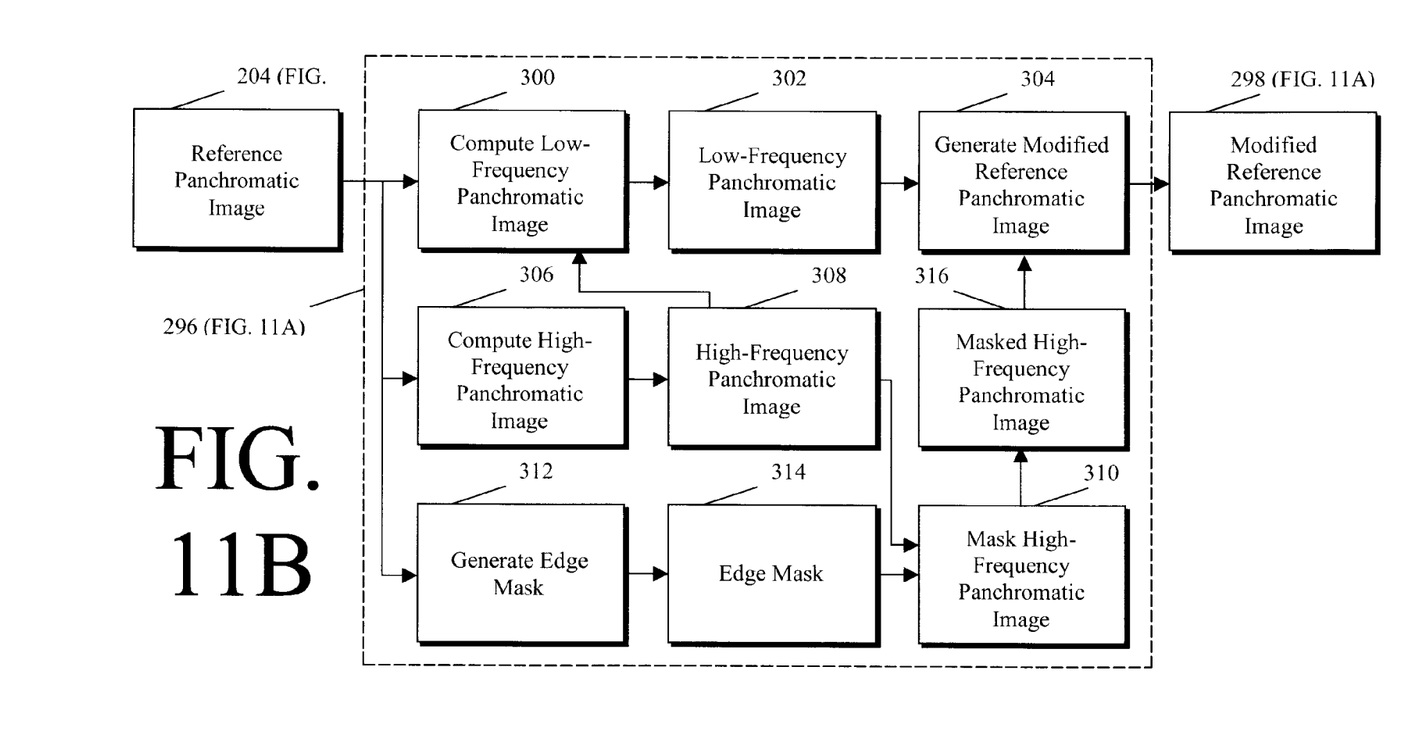
FIG. 11B is a block diagram showing block 296 in FIG. 11A in more detail of an alternate embodiment of the present invention.

FIG. 11B is a detailed diagram of the modify reference panchromatic image block 296 (FIG. 11A). A compute low-frequency panchromatic image block 300 produces a low-frequency panchromatic image 302 from the reference panchromatic image 204 (FIG. 2) and a high-frequency panchromatic image 308. A compute high-frequency panchromatic image block 306 produces a high-frequency panchromatic image 308 from the reference panchromatic image 204 (FIG. 2). A generate edge mask block 312 produces an edge mask 314 from the reference panchromatic image 204 (FIG. 2). A mask high-frequency panchromatic image block 310 produces a masked high-frequency panchromatic image 316 from the high-frequency panchromatic image 308 and the edge mask 314. A generate modified reference panchromatic image block 304 produces the modified reference panchromatic image 298 (FIG. 11A) from the masked high-frequency panchromatic image 316 and the low-frequency panchromatic image 302.

In FIG. 11B, the compute low-frequency panchromatic image block 300 can be performed in the same way as the compute low-frequency panchromatic image block 288 (FIG. 10B). The compute high-frequency panchromatic image block 306 can be performed in the same way as the high-frequency panchromatic image generation block 210 (FIG. 3). The generate edge mask block 312 can be performed in the same way as the edge mask generation block 242 (FIG. 6). The mask high-frequency panchromatic image block 310 can be performed in the same way as the high-frequency panchromatic image scaling block 246 (FIG. 6). The generate modified reference panchromatic image block 304 can be performed in the same way as the generate modified reference panchromatic image block 294 (FIG. 10B).

Figure 12A:
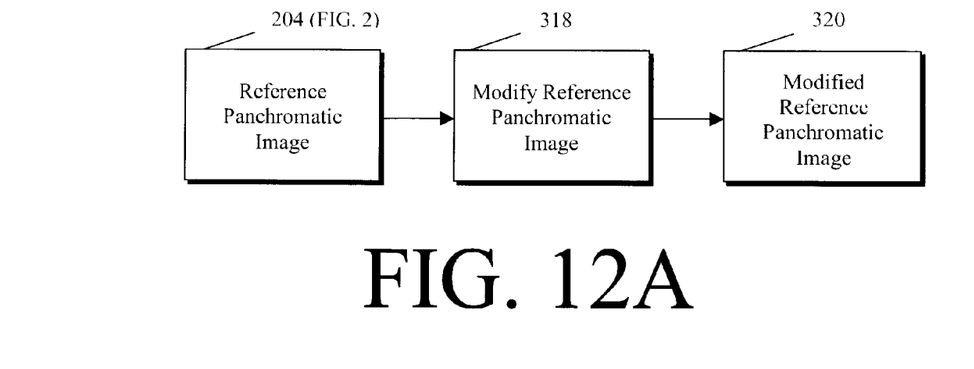
FIG. 12A is a block diagram showing an alternate embodiment of the present invention.

FIG. 12A is a high-level diagram of an alternate embodiment of the present invention. A modify reference panchromatic image block 318 produces a modified reference panchromatic image 320 from the reference panchromatic image 204 (FIG. 2). It will be clear to those skilled in the art that the modified reference panchromatic image 320 can be used in place of the reference panchromatic image 204 (FIG. 2) in any of the previously or subsequently described embodiments of the present invention.

Figure 12B:
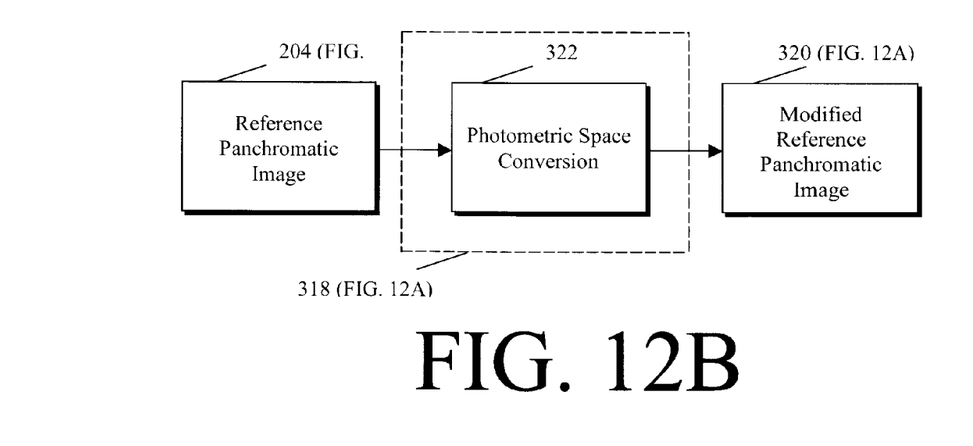
FIG. 12B is a block diagram showing block 318 in FIG. 12A in more detail of an alternate embodiment of the present invention.

FIG. 12B is a detailed diagram of the modify reference panchromatic image block 318 (FIG. 12A). A photometric space conversion block 322 produces a modified reference panchromatic image 320 (FIG. 12A) from the reference panchromatic image 204 (FIG. 2). The photometric space conversion block 322 can be performed in any appropriate way known to those skilled in the art. As an example, U.S. Pat. No. 5,708,729 (Adams et al.) teaches the use of a logarithm and polynomial function to photometrically convert an image.

Figure 13:
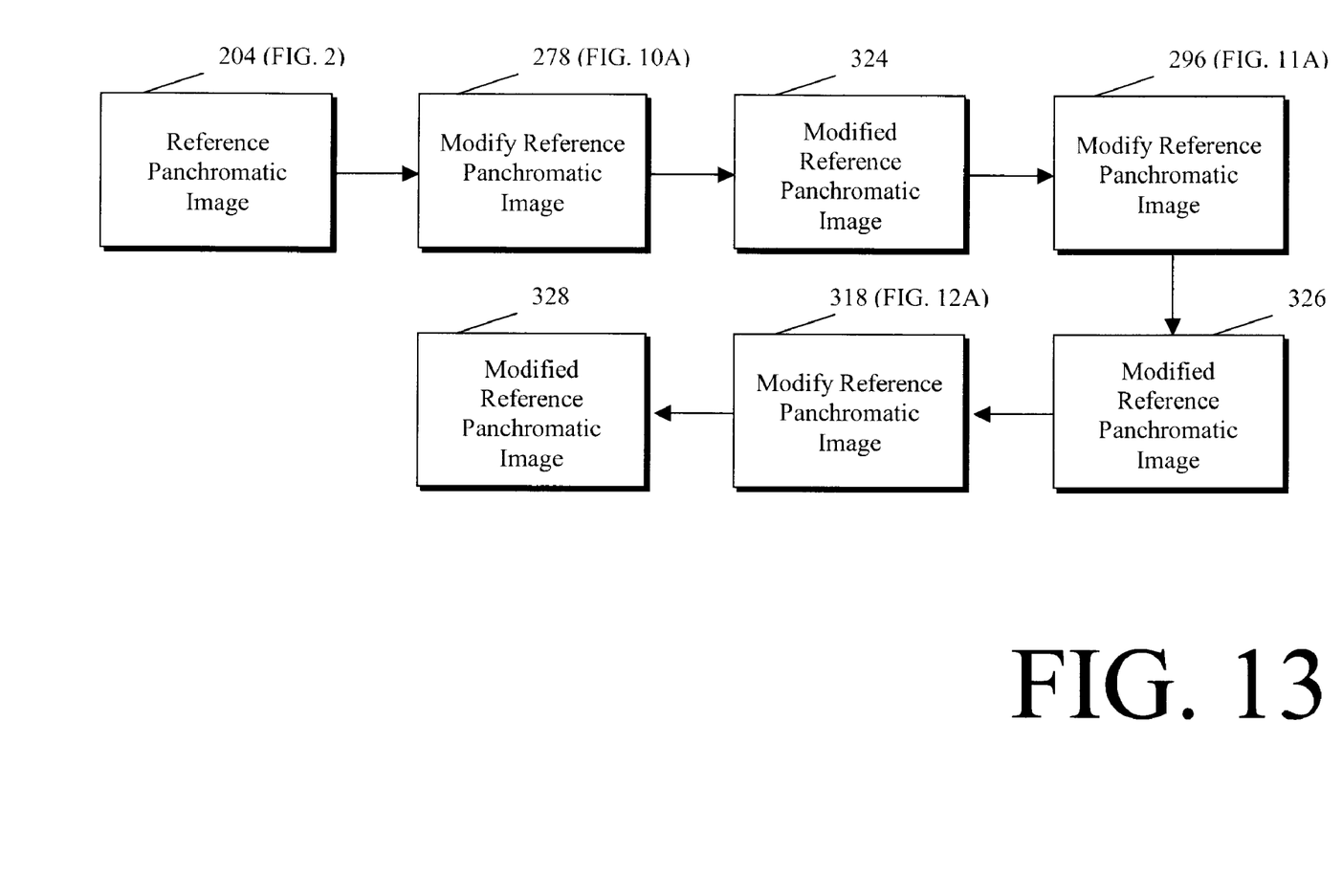
FIG. 13 is a block diagram showing an alternate embodiment of the present invention.

FIG. 13 is a high-level diagram of an alternate embodiment of the present invention. The modify reference panchromatic image block 278 (FIG. 10A) produces a modified reference panchromatic image 324 from the reference panchromatic image 204 (FIG. 2). The modify reference panchromatic image 296 (FIG. 11A) produces a modified reference panchromatic image 326 from the modified reference panchromatic image 324. The modify reference panchromatic image 318 (FIG. 12A) produces a modified reference panchromatic image 328 from the modified reference panchromatic image 326. It will be clear to those skilled in the art that the chain of operations shown in FIG. 13 can be lengthened, shortened, and rearranged in any manner and remain within the spirit and scope of the invention.

The sharpening algorithms disclosed in the preferred embodiments of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the sharpening algorithms can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithms themselves can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithms can interface with a variety of workflow user interface schemes.

The sharpening algorithms disclosed herein in accordance with the invention can have interior components that utilize various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk—read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
200 RGBP CFA Image
202 Panchromatic Image Interpolation
204 Reference Panchromatic Image
206 RGB CFA Image Interpolation
208 Full-Color Image
210 High-Frequency Panchromatic Image Generation
212 High-Frequency Panchromatic Image
214 Sharpened Full-Color Image Generation
216 Sharpened Full-Color Image
218 High-Frequency Panchromatic Image Generation
220 High-Frequency Panchromatic Image
222 High-Frequency Panchromatic Image Modification
224 Modified High-Frequency Panchromatic Image
226 Sharpened Full-Color Image Generation
228 Sharpened Full-Color Image
230 High-Frequency Panchromatic Image Generation
232 High-Frequency Panchromatic Image
234 High-Frequency Panchromatic Image Modification
236 Modified High-Frequency Panchromatic Image
238 Sharpened Full-Color Image Generation
240 Sharpened Full-Color Image
242 Edge Mask Generation
244 Edge Mask
246 High-Frequency Panchromatic Image Scaling

248 Edge Mask Generation
250 Edge Mask
252 High-Frequency Panchromatic Image Scaling
254 Scaled High-Frequency Panchromatic Image
256 Coring
258 Edge Mask Generation
260 Edge Mask
262 Coring
264 Cored Edge Mask
266 High-Frequency Panchromatic Image Scaling
268 Edge Mask Generation
270 Edge Mask
272 High-Frequency Panchromatic Image Scaling
274 Coring
276 Cored High-Frequency Panchromatic Image
278 Modify Reference Panchromatic Image
280 Modified Reference Panchromatic Image
282 Compute High-Frequency Panchromatic Image
284 High-Frequency Panchromatic Image
286 Coring
288 Compute Low-Frequency Panchromatic Image
290 Low-Frequency Panchromatic Image
292 Cored High-Frequency Panchromatic Image
294 Generate Modified Reference Panchromatic Image
296 Modify Reference Panchromatic Image
298 Modified Reference Panchromatic Image
300 Compute Low-Frequency Panchromatic Image
302 Low-Frequency Panchromatic Image
304 Generate Modified Reference Panchromatic Image
306 Compute High-Frequency Panchromatic Image
308 High-Frequency Panchromatic Image
310 Mask High-Frequency Panchromatic Image
312 Generate Edge Mask
314 Edge Mask
316 Masked High-Frequency Panchromatic Image
318 Modify Reference Panchromatic Image
320 Modified Reference Panchromatic Image
322 Photometric Space Conversion
324 Modified Reference Panchromatic Image
326 Modified Reference Panchromatic Image
328 Modified Reference Panchromatic Image

The invention claimed is:

1. A method of sharpening a full-color image of a scene comprising:
   (a) capturing an image of the scene using a two-dimensional sensor array having both color and panchromatic pixels;
   (b) forming the full-color image in response to the captured color pixels and forming a reference panchromatic image in response to the captured panchromatic pixels;
   (c) forming a high-frequency panchromatic image from the reference panchromatic image; and
   (d) providing a sharpened full-color image in response to the high-frequency panchromatic image and the full-color image.

2. The method of claim 1 further including modifying the high-frequency panchromatic image prior to using such panchromatic image in step (d).

3. The method of claim 2 wherein the modification further includes coring the high-frequency panchromatic image.

4. The method of claim 2 wherein the modification is further responsive to the reference panchromatic image.

5. The method of claim 4 wherein the modification further includes forming an edge mask and producing the modified high-frequency panchromatic image in response to the edge mask.

6. The method of claim 4 wherein the modification further includes forming an edge mask and coring and producing the modified high-frequency panchromatic image in response to the edge mask and coring.

7. The method of claim 1 further including modifying the reference panchromatic image to produce a modified reference panchromatic image.

8. The method of claim 7 wherein the modification of the reference panchromatic image includes coring.

9. The method of claim 7 wherein the modification of the reference panchromatic image includes forming an edge mask and producing the modified reference panchromatic image in response to the edge mask.

10. The method of claim 7 wherein the modification of the reference panchromatic image includes photometric conversion.

11. The method of claim 7 wherein the modification of the reference panchromatic image includes forming an edge mask, coring, and photometric conversion and producing the modified reference panchromatic image in response to the edge mask, coring, and photometric conversion.

* * * * *